2,689,492

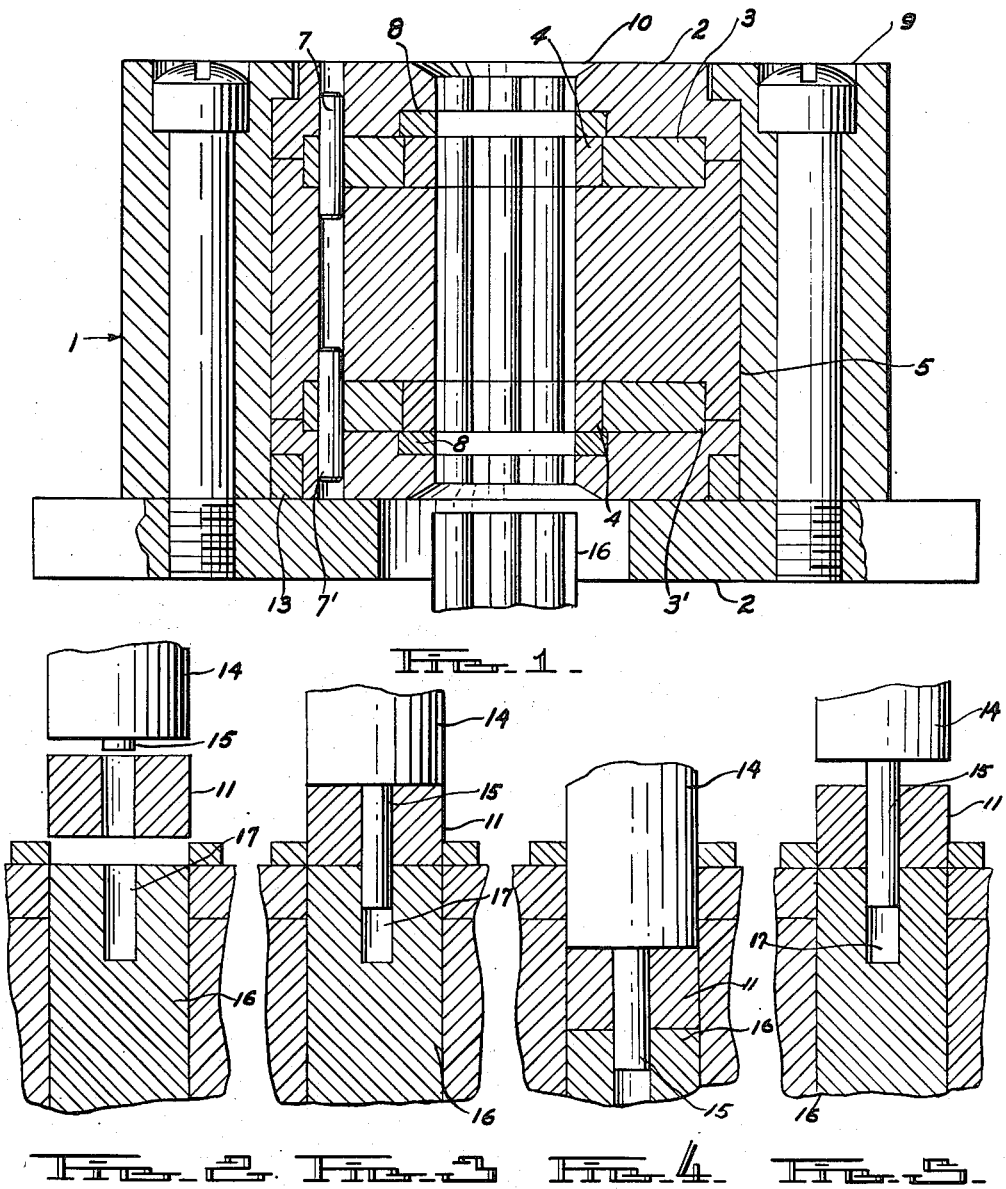
Sept. 21, 1954     E. E. ENSIGN     2,689,492
RESTRIKING PROCESS
Filed Jan. 7, 1948
ELBERT EDWIN ENSIGN
INVENTOR.
ATTORNEYS Patented Sept. 21, 1954

UNITED STATES PATENT OFFICE 2,689,492

RESTRIKING PROCESS

Elbert E. Ensign, Ypsilanti, Mich., assignor to Ford Motor Company, Dearborn, Mich., a corporation of Delaware Application January 7, 1948, Serial No. 867

4 Claims. (Cl. 78—81)

This application is concerned with a process and apparatus for restriking or coining hollow objects. While not strictly limited thereto, the process of this application is best adapted to the restriking operation employed to impart the final or finished shape and dimensions to metallic articles which have been fabricated by pressing metal powder and sintering the shape so produced.

The uses of the powdered metal techniques have been rapidly expanding despite the handicap of a relatively more expensive raw material. This has been especially true in the case of parts where the weight of the finished part is comparatively small and the shape comparatively intricate so that a large amount of machining would be required to produce the part from ordinary solid stock. In such cases the extra cost of the powdered starting metal over that of the solid stock is more than compensated for by the savings in machining costs. To retain this advantage, however, it is necessary that the powdered metal techniques be capable of producing finished parts that require no final machining whatever, or at most only the absolute minimum of such work.

In the usual powdered metal procedures, a weighed quantity of the proper powdered metal is compacted in a die to give a compact or "green form" having approximately the shape and dimension required of the final product. This compact is mechanically very weak and must be sintered by the application of a closely controlled degree of heat to improve its mechanical qualities. Unfortunately, this sintering process almost invariably produces both dimensional changes and warpage in the pressed article. This is especially the case where the shape is large or the contours complicated.

It has been found to be impossible to eliminate entirely or compensate for these unwanted sintering changes so the art has resorted to a final restriking or coining operation in which the sintered compact is placed in an appropriate die and subjected to heavy pressures to yield a final object of acceptable dimensions and shape. In this way the necessity for expensive machining operations has been eliminated and the compacts have been compressed to the required density.

Applicant was confronted with the problem of producing from powdered metals gears suitable for use in the pump employed to pump lubricant in automotive engines. The desired gears were 1.300 inches long, had a bore of 0.400 inch and an outside diameter of 1.130 inches. The usual powdered metal techniques of pressing the powder, sintering and then coining and restriking were employed, but it was found to be impossible to hold the finished gear to the necessary close tolerances particularly as to concentricity between the inside diameter and the bore. The eccentricity which developed in the sintering and coining was slight, but nevertheless sufficient to render the gear unacceptable without a final machining step. The cost of this final machining was such that the process would then be uneconomical. In correcting this deficiency in the ordinary powdered metal processes, the instant invention was perfected.

Accordingly, it is an object of this invention to provide a process and apparatus for coining sintered powdered metal objects to produce a substantially finished article.

It is a further object of this invention to provide a process and apparatus especially adapted to the production of elongated objects having a central bore which is maintained precisely concentric with the outside diameter.

With these and other objects in view, the invention comprises the arrangement, construction and combination of the various elements of the structure described in the specification, claimed in the claims and illustrated in the accompanying drawings, in which:

Figure 1 is a sectional view of a restrike die assembly intended to be bolted upon a die shoe which has been illustrated diagrammatically.

Figure 2 is a diagrammatic showing of a press with a sintered compact in place before the press starts to move.

Figure 3 is a diagrammatic showing of the press with the core rod driven through the bore of the gear and into the lower punch member.

Figure 4 shows diagrammatically the press at the end of the downstroke.

Figure 5 shows diagrammatically the press when the compact has been partially ejected.

The divers component parts of the die structure are assembled within the die retainer 1. The first member to be placed within the die retainer is locator 2, the interior of which is shaped to conform to the gears to be produced. This locator is provided with an outside diameter sizing ring 8, preferably made of tungsten carbide, or other similar wear resistant material. In gear pump manufacture, it is important that the outside diameter of the gear be held to rather close tolerances, and this outside diameter sizing ring serves to accurately establish this dimension. This ring is best inserted in locator 2 by pressing while the ring is at a low temperature. The locator is also provided with a bevel indicated at 10. Thus, it will be seen that locator 2 serves as a carrier for the outside diameter sizing ring 8 and also by means of bevel 10 to guide the gear and sizing punch into the die.

Next is inserted retaining ring 3. This retaining ring carries involute forming die 4 which is also made of hard and wear resistant material such as tungsten carbide. The retaining ring lends mechanical support to the forming die 4 and restrains it against radial expansion. The interior surface of this die is provided with a serrated working surface which actually imparts to the gear teeth their final form and size.

Adjacent the retaining ring and locator is placed the die body 5. The interior of this die body is also contoured to conform to the shape of the gear being formed.

Below die body 5 is placed a retaining ring structure 3' equipped with an involute forming die 4' and a locator 2' equipped with an outside diameter sizing ring 8'. This lower involute forming die 4' and outside diameter sizing ring 8' serve to align angularly and axially, respectively, an ejecting punch inserted from below to eject pressed gear from the die body. This punch will, of course, have an exterior conforming to that of the gear being produced. It will be noted that these lower members 2', 3', 4', and 8' are identical with the similarly numbered upper parts and are arranged in the die so as to be a mirror image thereof. Correct alignment of all parts is ensured by the use of locator pins 7 and 7'. Filler ring 13 completes the assembly which, in use, is supported by a die shoe.

As indicated in Figures 2, 3, 4, and 5, the die assembly shown in Figure 1 is designed to be used in connection with a press fitted with upper punch 14 and lower punch 16. Upper punch 14 is provided with retractable core rod 15 which is designed to fit snugly into core rod receptacle 17 which has been machined into lower punch 16.

The position of the various parts of the machine ready to start a coining or restriking operation is shown in Figure 2 with a gear 11 in place. It will be noted that the upper punch 14 and the lower punch 16 are in their extreme upper positions and that core rod 15 is retracted entirely into upper punch 14. The first movement of the press is to cause the core rod 15 to emerge from upper punch 14 and to completely impale gear 11 and to enter core rod receptacle 17 in lower punch 16 for a substantial distance. This is the position shown in Figure 3. At this point the gear has not substantially entered the die, and the upper punch 14 has not initiated its downward stroke.

Upper punch 14 and lower punch 16 now move downward simultaneously and force the gear into the die cavity. During this downstroke the core rod 15 remains in core rod receptacle 17. The position of the various members at the end of the downstroke is shown in Figure 4 of the drawings. At this point the gear has been densified and given its final contour except for the trimming operation involved in the removal of the gear from the die.

The upper punch 14 and the lower punch 16 now move upwardly together, the upper punch 14 moving a distance somewhat greater than the lower punch 16 to permit clearance to remove the gear. During the entire upstroke, core rod 15 remains in place in core rod receptacle 17. When the two punches have reached the upper limit of the stroke and the gear has been ejected from the die, the core rod 15 is removed from the gear. Figure 5 shows the two punches in their upper position prior to the removal of the core rod 15 from the gear.

The use of the above-described process for coining or restriking sintered gears has been found to eliminate the eccentricity invariably found in gears coined in the usual pressing operation. In this process the core rod 15 is thrust through the gear and into the lower punch before the gear is forced into the die. In that way the core rod 15 acts as a beam supported at each end and eccentricity is possible only to the extent to which core rod 15 can be bent when so supported. In the usual processes in which the core rod is supported only from one end, the eccentricity is limited only by the extent to which the core rod can be bent when supported at only one end. With the high pressures commonly used in restriking operations, this flexing of the core rod when supported at only one end produced eccentricities which were commercially prohibitive.

This application in the description has been directed particularly to the manufacture of gears. However, the inventive concept is by no means so limited, but may be applied at any place where a similar problem exists.

I claim as my invention:

1. The process of accurately forming and densifying in a die a cylindrical article having an axial bore comprising the steps of placing the article between two coacting punches each of which is rigidly supported against radial displacement, thrusting a rigid core rod from one of said punches through the axial bore of the article and into a receptacle formed in the other of said punches before the article begins its entry into the die whereby said core rod is rigidly supported at each end of the article against radial displacement, causing the punches to force the article into the die, and to there densify the article to the desired degree, causing the punches to expel the article from the die and continuing to support the core rod by both punches against radial displacement during the entire time pressure is applied to the article and finally withdrawing the core rod into the first mentioned punch only after the article has been substantially withdrawn from the die.

2. The process of accurately forming and densifying in a die a cylindrical article having an axial bore and in which said bore is long as compared to its diameter comprising the steps of placing the article between two coacting punches each of which is rigidly supported against radial displacement, thrusting a rigid core rod from one of said punches through the axial bore of the article and into a receptacle formed in the other of said punches before the article begins its entry into the die whereby said core rod is rigidly supported at each end of the article against radial displacement, causing the punches to force the article into the die and to there densify the article to the desired degree, causing the punches to expel the article from the die and continuing to support the core rod by both punches against radial displacement during the entire time pressure is applied to the article and finally withdrawing the core rod into the first mentioned punch only after the article has been substantially withdrawn from the die.

3. The process of accurately forming and densifying in a die a pressed and sintered gear having an axial bore comprising the steps of placing the gear between two coacting punches each of which is rigidly supported against radial displacement, thrusting a rigid core rod from one of said punches through the axial bore of the gear and into a receptacle formed in the other of said punches before the gear begins its entry into the die whereby said core rod is rigidly supported at each end of the gear against radial displacement, causing the punches to force the gear into the die and to there densify the gear to the desired degree, causing the punches to expel the gear from the die and continuing to support the core rod by both punches against radial displacement during the entire time pressure is applied to the gear and finally withdrawing the core rod into the first mentioned punch only after the gear has been substantially withdrawn from the die.

4. The process of accurately forming and densifying in a die a cylindrical pressed and sintered gear having an axial bore and in which said bore is long as compared to its diameter comprising the steps of placing the gear between two coacting punches each of which is rigidly supported against radial displacement, thrusting a rigid core rod from one of said punches through the axial bore of the gear and into a receptacle formed in the other of said punches before the gear begins its entry into the die whereby said core rod is rigidly supported at each end of the gear against radial displacement, causing the punches to force the gear into the die, and to there densify the gear to the desired degree, causing the punches to expel the gear from the die and continuing to support the core rod by both punches against radial displacement during the entire time pressure is applied to the gear and finally withdrawing the core rod into the first mentioned punch only after the gear has been substantially withdrawn from the die.

References Cited in the file of this patent

UNITED STATES PATENTS

| Number | Name | Date |
|---|---|---|
| 1,266,963 | Limont | May 21, 1918 |
| 1,278,746 | Prouty | Sept. 10, 1918 |
| 1,382,734 | Limont | June 28, 1921 |
| 1,415,459 | Limont | May 9, 1922 |
| 1,722,787 | Claus | July 30, 1929 |